No. 894,679. PATENTED JULY 28, 1908.
M. G. MELVIN.
FILTERING DEVICE.
APPLICATION FILED APR. 24, 1907.

Witnesses
F. C. Gibson.
C. Bradway.

Inventor
Mark G. Melvin.

By Victor J. Evans
Attorney

UNITED STATES PATENT OFFICE.

MARK G. MELVIN, OF SCRANTON, PENNSYLVANIA.

FILTERING DEVICE.

No. 894,679.  Specification of Letters Patent.  Patented July 28, 1908.

Application filed April 24, 1907. Serial No. 370,098.

*To all whom it may concern:*

Be it known that I, MARK G. MELVIN, a citizen of the United States, residing at Scranton, in the county of Lackawanna and State of Pennsylvania, have invented new and useful Improvements in Filtering Devices, of which the following is a specification.

This invention relates to filtering devices especially adapted for household and other purposes for filtering the water taken from the city mains.

The invention has for one of its objects to improve and simplify the construction and operation of devices of this character so as to be comparatively easy and inexpensive to manufacture, and thoroughly reliable and efficient in service.

A further object of the invention is the provision of a simple and efficient means for cleaning the filtering element from the mud or other sediment so that the water can be effectively filtered and the flow maintained at its maximum rate.

Another object is the provision of a device arranged to discharge jets of water against the inlet side of the filtering element so as to dislodge the mud and sediment therefrom when the same becomes clogged.

With these objects in view and others, as will appear as the description proceeds, the invention comprises the various novel features of construction and arrangement of parts which will be more fully described hereinafter and set forth with particularity in the claims appended hereto.

Figure 1:
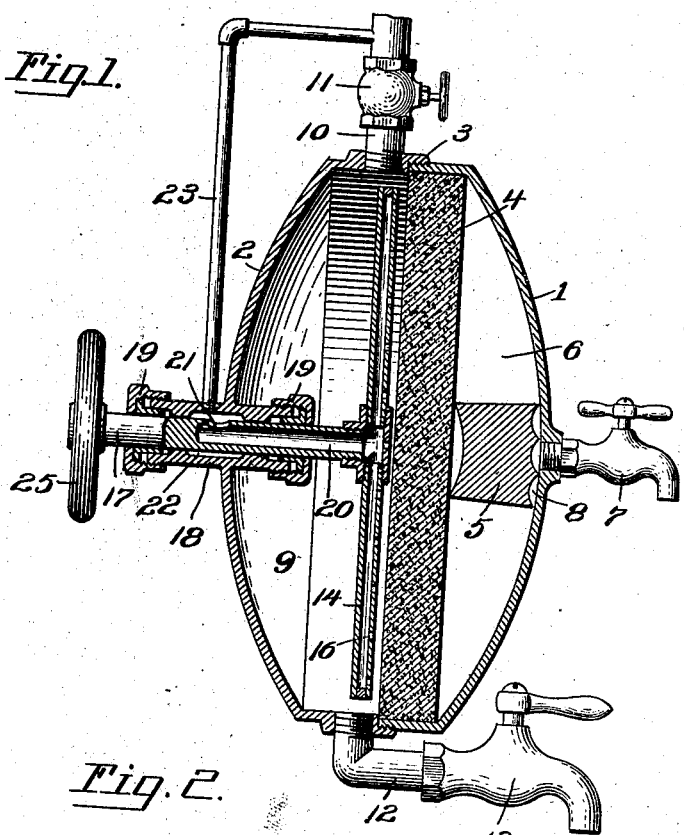
Figure 2:
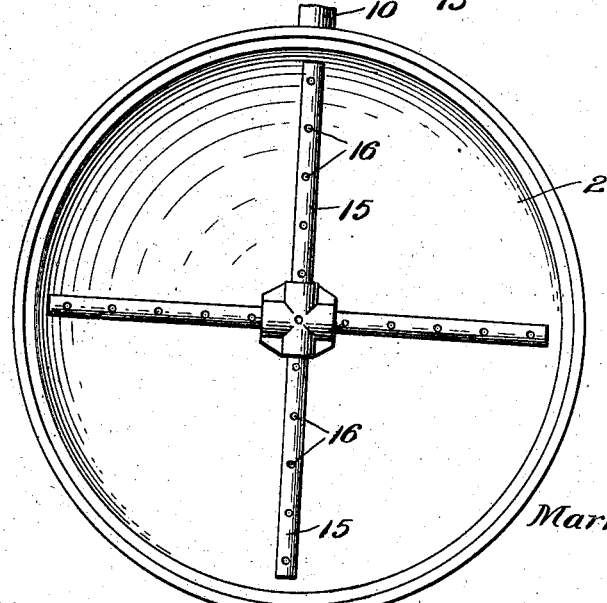

In the accompanying drawing, which illustrates one of the embodiments of the invention, Figure 1 is a vertical central section of the filter. Fig. 2 is a front view with one half of the shell or casing and filtering element removed.

Similar reference characters are employed to designate corresponding parts throughout the several figures.

Referring to the drawing, 1 and 2 designate the front and rear sections of the metal or other casing of the device, the sections being detachably connected, as by screw threads 3. In the front section is arranged a disk or other body 4 of porous material that forms the filtering element of the device, the said element being arranged in a vertical plane with its periphery snugly fitting the internal cylindrical wall of the section 1 and its front side being supported on a block 5 disposed intermediate the element and the dished front of the section 1. The space between the element 4 and front of the section 1 forms an outlet chamber 6 for the filtered water, which is adapted to be led off from the device through a faucet 7 arranged at the center of the section 1 in line with the block or support 5, which latter is scalloped at 8 to permit the water to freely flow to the faucet. The space between the rear side of the element 4 and back sections 2 of the casing constitutes an inlet chamber 9 to which water is supplied through a service pipe 10 connected with the top of the filter casing. This pipe is preferably provided with a globe valve 11, whereby the supply through the said pipe can be cut off, and at the bottom of the chamber 9 is a drain pipe 12 having a cock 13. The water feeding into the chamber 9 through the pipe 10 percolates through the filtering element to the chamber 6 and is drawn off through the faucet 7 thoroughly filtered.

The device for cleaning the filtering element 4 comprises a spider or cruciform frame designated generally by 14 that is permanently arranged within the filter casing on the inlet side of the element 4 and is composed of a plurality of hollow radial arms 15 having forwardly opening apertures 16 whereby jets of water at high pressure and velocity can be discharged against the front surface of the element 4. This frame 14 is mounted to be freely rotated so that the entire surface of the element can be washed by the jets of water playing thereon. For this purpose, the frame is provided with a central horizontally-extending stem 17 passing through a tubular extension 18 formed on the section 2 of the filter casing and extending both inwardly and outwardly, the extension having stuffing boxes 19 on its ends for preventing leakage around the stem 17. The stem is preferably hollow at its inner portion to serve as a conduit for supplying water to the cleaning device. The bore 20 of the stem has a port 21 that communicates with an annular chamber 22 in the extension or boss 18, and this chamber is supplied with water through a pipe 23 communicating therewith. Preferably, the pipe constitutes a by-pass connected with the service pipe 10 at a point on the inlet side of the cut-off valve 11.

By opening the valve 13, water discharges through the by-pass 23 and enters the hollow arms 15 where it is discharged through the jet openings 16 forcibly against the filtering element. This dislodges the deposit thereon and thoroughly cleanses the pores of the element and the mud, filth and the like passes off with the water from the casing through the drain 12. Simultaneously with the discharge water through the cleaning device, the stem 17, which has a hand wheel 25, is turned continuously so that every portion of the filtering element will be cleansed. After this operation has been carried on for a sufficient length of time, the valve 11 can be opened to thoroughly flush out the chamber 9, after which the cock 13 is closed. The device is now in condition for supplying filtered water, and by opening the valve of the faucet 7, filtered water can be drawn off.

Having thus described the invention, what I claim is:—

1. The combination of a casing composed of front and rear sections, means for connecting the sections together, a filtering element mounted in and removable with the front section, means on the front section for drawing off filtered water, a supply pipe secured to the rear section, a valved drain connected with the rear section at the bottom thereof, a jet discharging device mounted on the rear section in coöperative relation with the element, means for supplying water to the said device, and means behind the rear section and connected with the device for moving the latter during the discharge of water therethrough.

2. The combination of a casing, a filtering element therein dividing the casing into separate compartments, a valved supply pipe connected with one of the compartments, a valved drain connected with the bottom of the same compartment, a valved outlet connected with the other compartment for drawing off filtered water, jet discharging means disposed in coöperative relation with the element, a stem extending into the casing and having a bore communicating with the said means, an inlet port in the stem communicating with the bore, a conduit between the supply pipe and said port for supplying water to the said means during turning of the stem, and means on the outer end of the stem for turning the latter and said means.

3. The combination of a casing composed of front and rear sections screwed one into the other, a filtering element in the front section, a valved outlet on the front section for drawing off filtered liquid from the casing, a valved supply pipe connected with the rear section, a valved drain connected with the rear section, a rotatable jet-discharging device supported entirely on the rear section, means exterior to the casing for turning the device, and means for supplying liquid to the device simultaneously with the rotation thereof.

4. The combination of a casing, a filtering disk therein, a controllable supply pipe discharging into the casing and communicating with the space at one side of the disk, a valved outlet communicating with the space at the opposite side of the disk, a valved drain connected with the bottom of the casing and communicating with the space into which the supply pipe discharges, and means within the casing independent of the supply pipe for discharging jets of water against the surface of the disk.

5. The combination of a casing composed of two separable parts, a flat filtering element fixed on one part, a supply pipe connected with the casing, a rotatable device within the casing and mounted on the other part and having apertured tubular arms for discharging jets of water against the filtering element, a hollow stem extending into the casing and on the inner end of which the arms are rigidly secured, means fixed directly on the stem and located outside the casing for turning the stem, and means for supplying water to the stem.

6. The combination of a casing having hollow inward and outward extensions forming a chamber, a rotary member passing through the chamber and having a bore communicating with the latter, stuffing boxes around the member, a hand wheel on the member, a filtering element in the casing, and means on the member adjacent the element provided with a plurality of openings for discharging jets of water against the element, a supply pipe connected with the casing, and a pipe connected with the supply pipe and with the chamber for supplying water to the latter.

7. The combination of a casing composed of two parts, a filtering element arranged in and removable with one of the parts, a jet-discharging device disposed adjacent the element, a rotatable hollow stem mounted in the other part of the casing and forming the sole support for the said device, a valved drain secured to the part supporting the stem, a supply pipe also secured to the said part, a by-pass between the supply pipe and stem, and means fixed on the stem for turning the latter.

8. The combination of a casing, a filtering element therein, separate valved outlets communicating with the casing at opposite sides of the element, a hollow stem extending at right angles to the element and in line with the center thereof, hollow radial arms communicating with the stem and provided with apertures for discharging jets of water against the element, a chamber arranged on one of the walls of the casing and through which the stem extends, a port in the stem communicating with the chamber, packings at the points where the stem passes through the walls of the chamber, means secured to and carried by the stem for turning the latter, and means for supplying liquid to the chamber.

In testimony whereof, I affix my signature in presence of two witnesses.

MARK G. MELVIN.

Witnesses:
JOSEPH F. GILROY,
WM. J. MCKELVEY.